3,102,110
CHROMIUM-CONTAINING AZO DYESTUFFS
Guido Schetty, Basel, Switzerland, assignor to
J. R. Geigy A.G., Basel, Switzerland
No Drawing. Filed July 14, 1961, Ser. No. 124,024
Claims priority, application Switzerland July 15, 1960
6 Claims. (Cl. 260—151)

The present invention concerns chromium-containing azo dyestuffs, processes for the production thereof as well as their use for the dyeing of keratin material, in particular of wool. The invention also concerns, as industrial product, the materials dyed with these dyestuffs.

Complex chromium compounds of monoazo dyestuffs from diazotised 2-hydroxy-1-aminobenzene-5-sulphonic acid amides or 2-hydroxy-1-aminobenzene-5-alkyl sulphones and 1-acylamino-7-hydroxynaphthalenes which do not contain any groups which dissociate acid in water such as, e.g. sulphonic acid or carboxylic acid groups, have already been described. These dyestuffs dye wool in fast grey shades.

It has now been found that complex chromium compounds containing one atom of chromium bound in complex union with two monoazo dyestuff molecules of the Formula I

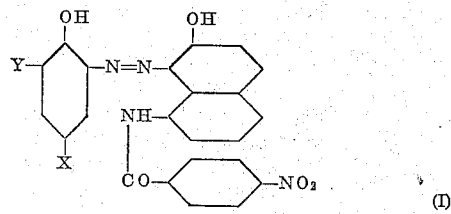

wherein X must be —$SO_2CH_3$, —$SO_2C_2H_5$, —$SO_2NH_2$, —$SO_2NHCH_3$, —$SO_2N(CH_3)_2$, —$COCH_3$, —$COC_2H_5$,

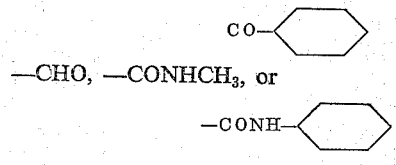

—CHO, —$CONHCH_3$, or

—CONH—⟨⟩ and Y must be —H, —$CH_3$ or —Cl, are distinguished by very high fastness to light. Particularly valuable dyestuffs are those in which X is the —$SO_2CH_3$ group.

The azo dyestuffs of Formula I are converted into their complex chromium compounds by reacting them with agents introducing chromium in aqueous or organic/aqueous solution at a raised temperature. In addition, azo dyestuffs of Formula I can also be used which, in the diazo component, contain a methoxy or ethoxy group instead of the phenolic hydroxyl group.

The chromium-containing dyestuffs according to the invention, which contain 2 molecules of azo dyestuff to 1 chromium atom, are produced advantageously in a weakly acid, neutral or weakly alkaline medium at temperatures of from 80° to 140° C., if necessary under pressure, the agent introducing chromium being used in such an amount that there is less than 1 chromium atom per 1 molecule of dyestuff.

The simple or complex chromium salts are used as agents introducing metal, for example, chromic fluoride, chromic sulphate, chromic acetate, chromic formate, chromic salts of aryl sulphonic acids and the alkali or ammonium salts of disalicylato chromic acids. Also salts of hexavalent chromium can be used as agents introducing chromium, e.g. the alkali and ammonium chromates and bichromates, this in particular when afterchroming or chroming the dyestuffs in substance in the presence of reducing agents, principally in the presence of reducing sugars.

Azo dyestuffs of Formula I are obtained by coupling, in an alkaline medium, diazotised amines of the general Formula II

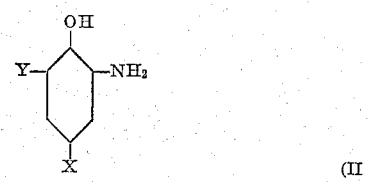

wherein X and Y have the meanings given in Formula I, with 1-(4'-nitrobenzoylamino)-7-hydroxynaphthalene. The reaction is possibly performed in the presence of tertiary nitrogen bases which accelerate the coupling such as, e.g. pyridine, lutidine, collidine, triethanolamine and mixtures thereof or in the presence of dimethyl formamide.

The chromium-containing dyestuffs according to the invention dye materials of animal origin, in particular wool but also silk or leather, in level, neutral grey shades from a neutral, but principally however, from a weakly acid bath. To attain better water solubility, the dyestuffs are possibly mixed also with slight amounts of basic salts, in particular with alkali phosphates such as, e.g. trisodium phosphate or tetrasodium pyrophosphate or with wetting agents having a dispersing action such as, e.g. higher alkyl-aryl sulphonates or polyalkylenoxide-fatty acid condensation products.

Compared with dyeings made with similar known chromium-containing azo dyestuffs, those attained on wool with the new chromium-containing azo dyestuffs are distinguished by increased fastness to light. In addition, they have very good fastness to alkali, washing, water and sea water and they are distinguished by their very level drawing power.

The dyestuffs according to the invention are also suitable for the dyeing and printing of synthetic fibres made from superpolyamides and superpolyurethanes.

Further details can be seen from the following examples. Where not otherwise expressly stated, parts are given as parts by weight. The temperatures are in degrees centigrade. The relationship of parts by weight to parts by volume is as that of grammes to cubic centimetres.

Example 1

2 dyestuff molecules:1 chromium atom complex of

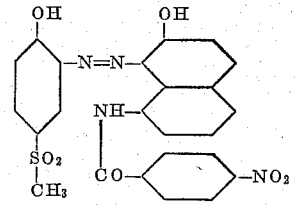

18.7 parts of 2-amino-1-hydroxybenzene-4-methyl sulphone are diazotised in 17 parts of concentrated hydrochloric acid and 120 parts of water. The suspension of the diazoxide is neutralised with sodium bicarbonate and is then poured into a solution of 32 parts of 1-(4'nitrobenzoylamino)-7-hydroxynaphthylene, 105 parts by volume of 1 N-caustic soda lye, 12 parts of sodium carbonate and 15 parts of pyridine. One completion of the dyestuff formation, the pH of the mixture is adjusted to 8 with caustic soda lye and the pyridine is distilled off with steam. Sodium chloride is then added to precipitate the dyestuff which is filtered off and dried. The dyestuff is then stirred with 350 parts of formadine, 12 parts of chromic acetate (corresponding to 3.12 parts of Cr) are added and the mixture is heated for several hours at 100–105° until the metal complex formation is complete. The chromium-containing dyestuff of the ratio 1 atom Cr:two dyestuff molecules is precipitated by the addition of a saturated sodium chloride solution, filtered off and dried. It is a black powder which dissolves in hot water with a blue-grey colour and dyes wool from a weakly acid bath in neutral grey shades which have very good fastness to light. If, instead of the 18.7 parts of 2-amino-1-hydroxybenzene-4-methyl sulphone, 20.1 parts of 2-amino-1-hydroxybenzene-4-ethyl sulphone are used, then dyestuffs are obtained which have similar properties.

*Example 2*

2 dyestuff molecules:1 chromium atom complex of

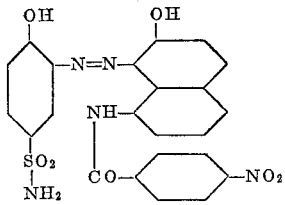

18.8 parts of 2-amino-1-hydroxybenzene-4-sulphonic acid amide are diazotised in the usual way in a hydrochloric acid solution with sodium nitrite and the diazonium compound is coupled under the conditions described in Example 1 with 1-(4'-nitrobenzoylamino)-7-hydroxynaphthalene. The dye paste while still moist is pasted into 500 parts of water, the pH of the suspension is adjusted to 7 and the whole is refluxed while stirring for 24 hours with 240 parts of sodium disalicylato chromate solution (corresponding to 3.12 parts of Cr). The complex chromium compound of the ratio 1 atom Cr:2 molecules dyestuff is precipitated by the addition of sodium chloride. It is filtered off and dried. To increase the water solubility, the dried dyestuff powder is milled with 10 parts of oleyl-N-methyl tauride.

The new dyestuff dyes wool from a weakly acid bath in neutral grey shades which are very fast to light.

Similar dyestuffs are obtained if, in the above example, instead of the 18.8 parts of 2-amino-1-hydroxybenzene-4-sulphonic acid amide, 20.2 parts of 2-amino-1-hydroxybenzene-4-sulphonic acid methylamide or 21.6 parts of 2-amino-1-hydroxybenzene-4-sulphonic acid dimethylamide are used.

*Example 3*

2 dyestuff molecules:1 chromium atom complex of

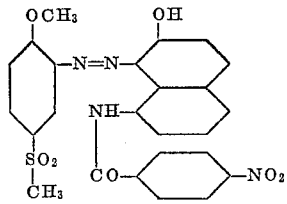

52.2 parts of dyestuff obtained by coupling diazotised 2-amino-1-methoxybenzene-4-methyl sulphone with 1-(4'-nitrobenzoylamino)-1-hydroxynaphthalene under the conditions described in Example 1, in 400 parts of formamide are heated with chromic formate (corresponding to 3.25 parts of Cr) at 135 to 137° until the metal complex formation is complete. The melt is poured into 2000 parts of dilute sodium chloride solution, the precipitated dyestuff is filtered off and washed with a little water. The chromium-containing dyestuff of the ratio 1 atom Cr:2 dyestuff molecules has dyeing properties which are equal to those of the complex produced according to Example 1.

*Example 4*

2 dyestuff molecules:1 chromium atom complex of

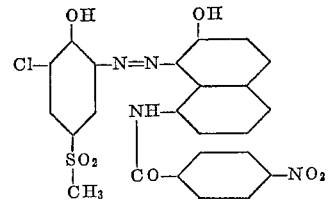

22.2 parts of 1-amino-2-hydroxy-3-chloro-5-methylsulphonylbenzene are diazotised in 17 parts of concentrateed hydrochloric acid and 120 parts of water and then neutralised with sodium bicarbonate. The suspension of the diazoxide so obtained is poured, while stirring at 0–5°, into a paste of 32 parts of 1-(4'-nitrobenzoylamino)-7-hydroxynaphthalene, 200 parts by volume of 1-N-caustic soda lye and 12 parts of sodium carbonate. The formation of the dyestuff is complete after about 15 minutes. The whole is heated to about 70°, sufficient sodium chloride is added to completely precipitate the dyestuff, the dyestuff is filtered off hot, washed with dilute sodium chloride solution and dried. The dry monoazo dyestuff is stirred into 300 parts of formamide and 12 parts of chromic acetate (corresponding to 3.12 parts of Cr), and then the whole is heated for some hours at 100–105° until the metal complex formation is complete. The chromium-containing dyestuff of the ratio 1 atom Cr:2 dyestuff molecules, is precipitated by the addition of a saturated sodium chloride solution, filtered off, washed with 2% sodium chloride solution and dried. It is a dark powder which, after milling with a dispersing agent such as oleyl-N-methyl tauride, dissolves in hot water with a blue-grey colour. It dyes wool from a neutral or weakly acid bath in grey shades which have excellent fastness to light and very good wet fastness properties.

If, instead of the 22.2 parts of 1-amino-2-hydroxy-3-chloro-5-methylsulphonylbenzene, 23.5 parts of 1-amino-2-hydroxy-3-chloro-5-ethylsulphonylbenzene, 22.3 parts of 1-amino-2-hydroxy-3-chlorobenzene-5-sulphonic acid amide, 20.2 parts of 1-amino-2-hydroxy-3-methyl-5-methylsulphonylbenzene, 21.5 parts of 1-amino-3-methyl-5-ethylsulphonylbenzene, 20.3 parts of 1-amino-3-methylbenzene-5-sulphonic acid amide or 23 parts of 1-amino-3-methylbenzene-5-sulphonic acid dimethylamide are used, then dyestuffs having very similar properties are obtained.

*Example 5*

2 dyestuff molecules:chromium atom complex of

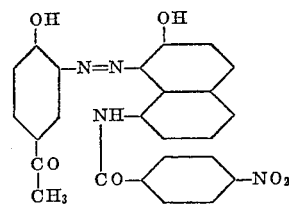

15.1 parts of 1-amino-2-hydroxy-5-acetylbenzene are diazotised in 20 parts of concentrated hydrochloric acid and 150 parts of water. The suspension of the diazo compound is neutralised with sodium bicarbonate and mixed, while stirring at 0–5°, with a paste of 32 parts of 1-(4'-nitrobenzoylamino)-7-hydroxynaphthalene, 200 parts by volume of 1 N-caustic soda lye and 12 parts of sodium carbonate. After the dyestuff formation is complete, the dyestuff is precipitated by the addition of sodium chloride, filtered off, washed with dilute sodium chloride solution and dried. The dry monoazo dyestuff is stirred with 300 parts of formamide and 12 parts of chromic acetate (corresponding to 3.12 parts of Cr) and then heated for some hours at 100–105° until the metal complex formation is complete. The melt, while still hot, is poured into an 80° warm, 20% sodium chloride solution whereupon the chromium-containing dyestuff precipitates. It is filtered off, washed first with 2% sodium chloride solution and then with a little water and dried. It is a dark grey powder which, after milling with a dispersing agent such as oleyl-N-methyl tauride, dissolves in hot water with a blue-grey colour. It dyes wool from a neutral or weakly acid bath in grey shades which have excellent fastness to light and very good wet fastness properties.

If, in the above example, instead of the 1-amino-2-hydroxy-5-acetylbenzene, 16.5 parts of 1-amino-2-hydroxy-5-propionylbenzene, 17.9 parts of 1-amino-2-hydroxy-5-methyl-5-propionylbenzene or 18.6 parts of 1-amino-2-hydroxy-3-chloro-5-acetylbenzene are used, then dyestuffs having very similar properties are obtained. Dyestuffs which are equally fast to light are obtained if the corresponding number of parts of 1-amino-2-hydroxy-5-benzoylbenzene or 1-amino-2-hydroxy-3-methyl-5-benzoylbenzene or 1-amino-2-hydroxy-3-chloro-5-benzoylbenzene are used.

*Example 6*

2 dyestuff molecules:1 chromium atom complex of

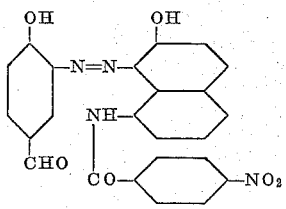

13.7 parts of 1-amino-2-hydroxy-5-formylbenzene are diazotised and coupled as described in example 5 with 32 parts of 1-(4'-nitrobenzoylamino)-7-hydroxynaphthalene. The monoazo dyestuff is isolated and dried. It is then heated in 600 parts of ethyl alcohol and 240 parts of the sodium salt of disalicylato chromic acid (corresponding to 3.12 parts of Cr) for 15 hours in a rotating autoclave lined with enamel at 105–110° and then the whole is evaporated to dryness. The residue is then stirred with 200 parts of cold water, the suspended dyestuff is filtered off and dried. The dark grey powder so obtained dyes wool from a neutral or weakly acid bath in very light fast, lead grey shades.

*Example 7*

2 dyestuff molecules:1 chromium atom complex of

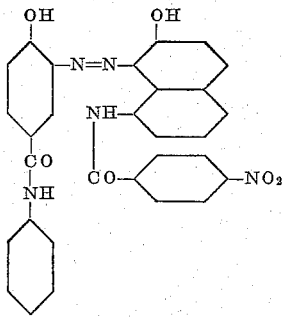

56.9 parts of the monosodium salt of the dyestuff obtained by coupling diazotised 1-amino-2-hydroxybenzene-5-carboxylic acid phenylamide with 1-(4'-nitrobenzoylamino)-7-hydroxynphthalene in 250 parts of formamide are heated for some hours at 100–105° with chromic formate (corresponding to 3.2 parts of Cr) until the complex formation is complete. A grey-black powder is obtained by precipitating with sodium chloride solution, filtering off and drying. After being dispersed, this powder dyes wool from a weakly acid bath in grey shades which are very fast to light.

Chromium complex compounds having similar properties are obtained from the monosodium salt of the monoazo dyestuff produced by coupling diazotised 1-amino-2-hydroxy-3-chlorobenzene-5-carboxylic acid phenylamide or 1-amino-2-hydroxy-3-methylbenzene-5-carboxylic acid phenylamide or 1-amino-2-hydroxybenzene-5-carboxylic acid methylamide or 1-amino-2-hydroxy-3-chlorobenzene-5-carboxylic acid methylamide or 1-amino-2-hydroxy-3-methylbenzene-5-carboxylic acid methylamide with 1-(4'-nitrobenzoylamino)-7-hydroxynaphthalene.

*Example 8*

1 part of the dyestuff obtained in Example 1 is dissolved in 5000 parts of hot water. The bath is brought to the boil, 1 part of acetic acid is added and 100 parts of previously well wetted wool flannel are entered. Dyeing is performed for 1½ hours at the light boil while continuously moving the goods, the wool is then rinsed well with warm water and dried. The wool flannel is dyed grey very evenly. The dyeing is distinguished by good wet fastness and remarkably good fastness to light.

What I claim is:

1. A complex chromium compound containing one atom of chromium bound in complex union with two monoazo dyestuff molecules of the formula

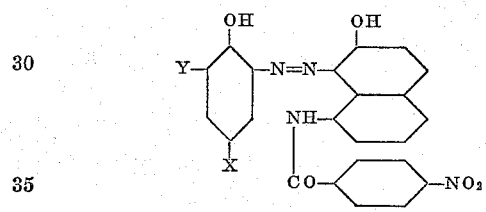

wherein

X is a member selected from the group consisting of —SO$_2$CH$_3$, —SO$_2$C$_2$H$_5$, —SO$_2$NH$_2$, —SO$_2$NHCH$_3$, SO$_2$N(CH$_3$)$_2$, —COCH$_3$, —COC$_2$H$_5$,

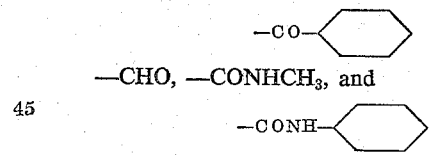

—CHO, —CONHCH$_3$, and and

Y is a member selected from the group consisting of —H, —CH$_3$ and —Cl.

2. The complex chromium compound containing one atom of chromium bound in complex union with two monoazo dyestuff molecules of the formula

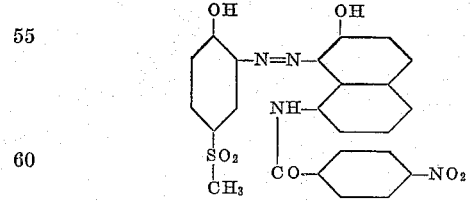

3. The complex chromium compound containing one atom of chromium bound in complex union with two monoazo dyestuff molecules of the formula

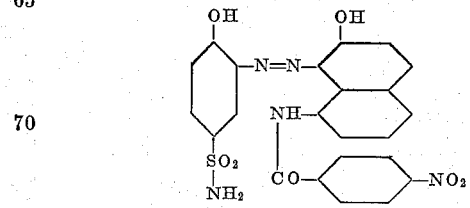

4. The complex chromium compound containing one atom of chromium bound in complex union with two monoazo dyestuff molecules of the formula

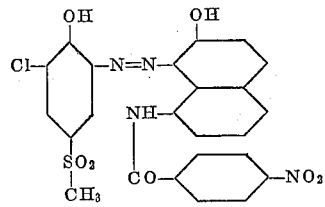

5. The complex chromium compound containing one atom of chromium bound in complex union with two monoazo dyestuff molecules of the formula

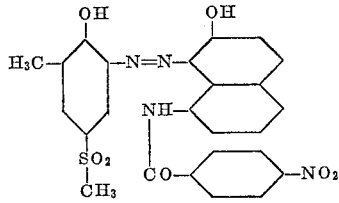

6. The complex chromium compound containing one atom of chromium bound in complex union with two monoazo dyestuff molecules of the formula

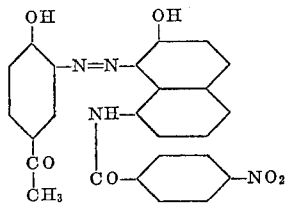

References Cited in the file of this patent
UNITED STATES PATENTS

| | | |
|---|---|---|
| 2,766,230 | Buehler et al. | Oct. 9, 1956 |
| 2,891,938 | Schetty | June 23, 1959 |
| 2,891,939 | Schetty | June 23, 1959 |